June 29, 1954     K. C. PURDY     2,682,124
GUARANTEE CONTAINER FOR BATTERIES
Filed July 16, 1951

INVENTOR.
Kenneth C. Purdy
BY
Wm H. Dean
AGENT

Patented June 29, 1954

2,682,124

UNITED STATES PATENT OFFICE 2,682,124

GUARANTEE CONTAINER FOR BATTERIES

Kenneth C. Purdy, Escondido, Calif.

Application July 16, 1951, Serial No. 236,934

1 Claim. (Cl. 40—19)

My invention relates to a guarantee container for batteries and the objects of my invention are:

First, to provide a guarantee container for motor vehicle storage batteries which forms an integral part of the battery and may be used for containing the guarantee for the life of the battery so that it does not become misplaced or lost.

Second, to provide a guarantee container for batteries of this class which may be in the form of a container cast as an integral portion of one of the electrical conductors of the battery.

Third, to provide a guarantee container of this class which maintains a guarantee paper in clean substantially original condition for a considerable length of time.

Fourth, to provide a guarantee container of this class which forms a very compact integral structural portion of the battery and which is very conveniently accessible.

Fifth, to provide a guarantee container for batteries which does not materially increase the cost of the battery in which it is incorporated and Sixth, to provide a guarantee container for batteries which is very simple and economical of construction, efficient in operation and which will not readily deteriorate or get out of order.

Figure 1:
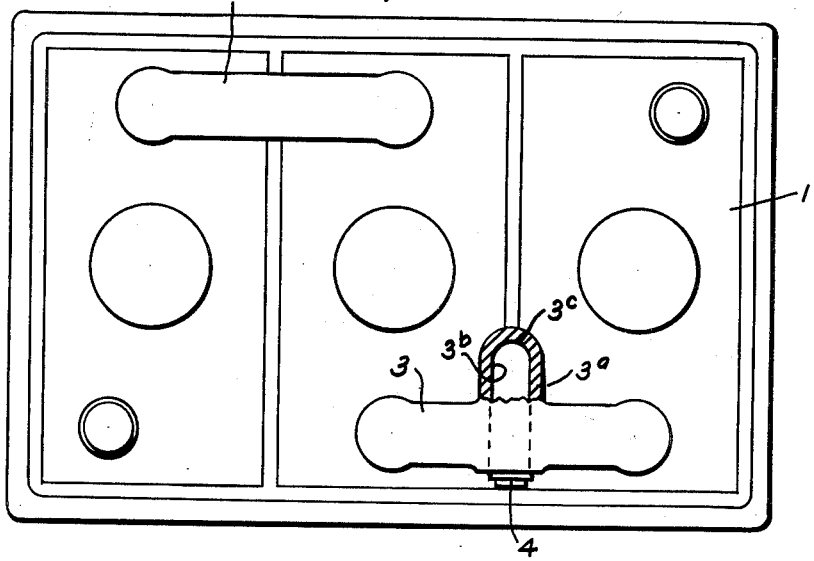
Figure 2:
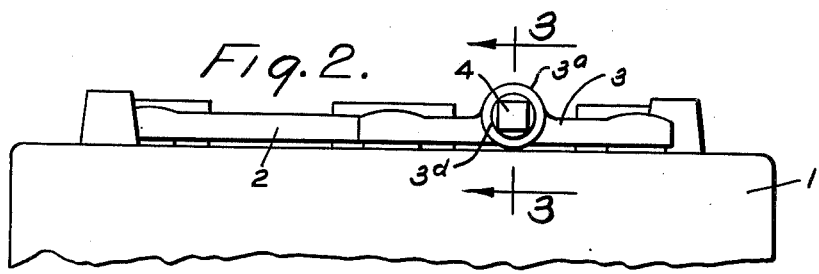
Figure 3:
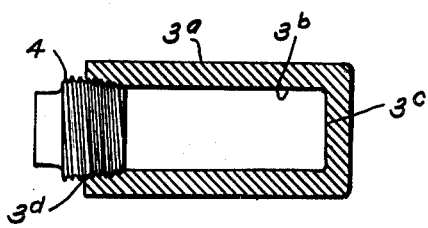

With these and other objects in view as will appear hereinafter my invention consists of certain novel features of construction combination and arrangement of parts and portions as will be hereinafter described in detail and particularly set forth in the appended claim reference being had to the accompanying drawings and to the characters of reference thereon forming a part of this application in which:

Fig. 1 is a top or plan view of a battery showing my guarantee container as an integral part thereof Fig. 2 is a fragmentary side elevational view of a battery showing my guarantee container thereon and Fig. 3 is an enlarged sectional view taken from the line 3—3 of Fig. 2.

Similar characters of reference refer to similar parts and portions throughout the several views of the drawings.

The conventional battery 1 is a three cell storage battery having conventional exposed electrical conductors 2 and 3 interconnecting the plates of adjacent cells. The electrical conductor 3 as shown in Figs. 1 and 2 of the drawing is provided with an enlarged transversed hollow tubular portion 3a which forms a container for a guarantee paper or other document as desired. This portion 3a is provided with a container bore 3b as shown in Fig. 3 of the drawings which is provided with an enclosed end 3c and a tapered pipe plug 4 is positioned in the opposite end of the bore 3b for enclosing the same. The electrical conductor 3 is preferably made of lead or other soft conventional material while the pipe plug 4 may be made of harder metal so that it forms its own thread when screwed into the open end 3d of the bore 3. In accordance with the foregoing objects of the invention the guarantee paper is enclosed in the container portion 3a at the time the battery is purchased and the plug 4 is screw threaded into the open end of the bore 3b which causes sealing of the open end 3b of the bore 3 against moisture and other foreign matter such as oil, acid or various corrosive elements.

The operation of my guarantee container for batteries is substantially as follows:

The guarantee paper is enclosed in the bore 3b as hereinbefore described and the purchaser of the battery 1 thus maintains the guarantee paper without loosing it and the integral container 3a may be opened by removing the plug 4 at any time the battery fails. If the guarantee period has not elapsed, the purchaser of the battery 1 thus presents his guarantee in order to receive either service or a new battery.

Though I have shown and described a particular construction, combination and arrangement of parts and portions I do not wish to be limited to this particular construction combination and arrangement but desire to include in the scope of my invention the construction combination and arrangement substantially as set forth in the appended claim.

Having thus described my invention what I claim as new and desire to secure by Letters Patent is:

A battery conductor strap of corrosion-resistant metal comprising two terminal-engaging ends and an intermediate thickened section, said section having a portion extending transversely of the strap on one side thereof, said section having a recess defining a container extending centrally of said section and transversely of said strap, said container having an unobstructed single opening adjacent the opposite side of said strap, said opening being closed by a plug comprised of a metal harder than said metal of the strap and having an external screw thread, and said plug being tapered and self-threading, said section having upper and lower wall portions of a combined thickness at least equivalent to the minimum thickness of the strap.

References Cited in the file of this patent

UNITED STATES PATENTS

| Number | Name | Date |
|---|---|---|
| 414,205 | Frauenberger | Nov. 5, 1889 |
| 1,364,025 | Billings | Dec. 28, 1920 |
| 1,743,899 | Moffatt | Jan. 14, 1930 |
| 2,061,649 | Campbell | Nov. 24, 1936 |
| 2,098,478 | Young | Nov. 9, 1937 |
| 2,175,481 | Padulo | Oct. 10, 1939 |
| 2,187,192 | Albrecht | Jan. 16, 1940 |